US005113921A

United States Patent [19]

Pool

[11] Patent Number: 5,113,921

[45] Date of Patent: May 19, 1992

[54] SHEET MATERIAL FOR MASKING APPARATUS

[75] Inventor: Dan B. Pool, Phoenix, Ariz.

[73] Assignee: Minnesota Mining and Manufacturing Company, St. Paul, Minn.

[21] Appl. No.: 642,712

[22] Filed: Jan. 17, 1991

Related U.S. Application Data

[63] Continuation of Ser. No. 330,225, Mar. 29, 1989, abandoned, which is a continuation of Ser. No. 116,508, Nov. 2, 1987, abandoned.

[51] Int. Cl.[5] .......... B32B 1/00; B32B 31/00; B65D 85/00; E04F 13/00

[52] U.S. Cl. .......... 156/71; 156/40

[58] Field of Search .......... 156/71, 554, 40; 206/389

[56] References Cited

U.S. PATENT DOCUMENTS

| | | | |
|---|---|---|---|
| 2,374,103 | 4/1945 | Johnson | 156/554 |
| 2,522,773 | 9/1950 | Bihary | 156/554 X |
| 3,553,060 | 1/1971 | Waltz | 156/554 X |
| 3,950,214 | 4/1976 | Pool et al. | 156/554 |
| 4,052,248 | 10/1977 | Hunter | 156/554 |
| 4,054,482 | 10/1977 | Wahlquist | 156/554 |
| 4,096,021 | 6/1978 | Pool et al. | 156/554 |
| 4,263,347 | 4/1981 | Banta | 156/71 |
| 4,379,019 | 4/1983 | Pool | 156/554 |

FOREIGN PATENT DOCUMENTS 52-106469 8/1977 Japan .

*Primary Examiner*—David A. Simmons
*Assistant Examiner*—Jeffrey G. Payne
*Attorney, Agent, or Firm*—Gary L. Griswold; Walter N. Kirn; William L. Huebsch

[57] ABSTRACT

An elongate sheet of flexible, fluid impervious material is folded into longitudinally extending pleats and coiled into a roll for use with masking apparatus of either the stationary or the hand held type. The sheet is coiled in a direction for continuous application of tape to overlap an edge of the outer surface of the roll as the folded sheet and the tape are dispensed. The first pleat is provided with a laterally projecting terminal portion to receive the tape and prevent contact between the underlying sheet material and the tape. After a length of the material is dispensed, severed from the roll and adhesively affixed to the surface to be masked, the sheet is extended laterally to unfold the pleats.

12 Claims, 2 Drawing Sheets

SHEET MATERIAL FOR MASKING APPARATUS

This application is a continuation of application Ser. No. 330,225, filed Mar. 29 1989, which is a continuation of application Ser. No. 116,50 filed Nov. 2, 1987 both now abandoned.

BACKGROUND OF THE INVENTION

1. Field of the Invention

This invention relates to material for masking surfaces preparatory to painting or application of other coatings.

More particularly, the present invention relates to improvements in coiled sheet material especially adapted for use in connection with masking apparatus of the type for dispensing tape and sheet material.

In a further and more specific aspect, the instant invention concerns sheet material capable of masking a surface of greater width than the width of the roll of coiled material.

2. The Prior Art

Apparatus for dispensing tape and paper for the purpose of masking a surface preparatory the application of paint or other treatments are well known. In general, the devices are commercially available in two basic configurations. One form, frequently termed an apron taper, tends to be relatively bulky and is considered a stationary device. The other, being sufficiently compact for portable manipulation, is usually referred to as a hand held masking machine.

Commonly, both varieties include a frame having means for rotatably supporting a roll of coiled sheet material and for rotatably supporting a roll of pressure sensitive tape. The roll of tape is positioned for continuous application along an edge of the sheet material as the tape and sheet material are uncoiled during dispensing. Usually, the devices also include a blade for severing the dispensed masking material.

The frame of the apron taper is provided with feet. During use, a taped edged sheet or apron of appropriate length is drawn from the stationary apparatus and then applied to the surface to be masked. A handle is integral with the portable device. The tape is applied as the machine is drawn along the surface during the masking procedure.

Conventionally, the width of the surface which can be masked is dictated by the width of the roll of sheet material. While sheet material of various widths are usually interchangeably dispensable from a single masking apparatus, the ultimate width is finite as determined by the capacity of the device. For example, the stationary dispensing apparatus usually includes a pair of spaced apart frame members between which the roll of sheet material must fit. A portable device is usually limited by the physical capability of the user. For purposes of reference, forty-eight inches is considered the practical limit for apron tapers while portable machines are limited to twenty-four inches. Even so, operation becomes increasingly cumbersome as sheet width increases.

In an attempt to provide a remedy and mask surfaces of greater width than the width of the sheet material, the prior art has provided rolls of folded sheet material. After the tape has been secured, the material is unfolded to drape over an extended surface. However, such sheet material which has been folded prior to being coiled is not usable in connection with conventional tape and paper dispensing apparatus of the type under immediate consideration.

The application of the tape to the sheet material requires great precision. Otherwise, the tape will adhere to more than one pleat of the folded sheet material rendering unfolding impossible. Therefore, the application of the tape to the sheet material has been limited to the manufacturing process where exacting tolerances can be exercised. Accordingly, the masking material has been available only as pre-taped rolls.

In addition to not being suitable for use in connection with tape and sheet material dispensing apparatus, other deficiencies are readily apparent. Exemplary is the fact that the relatively thick masking tape is responsible for an enlargement at one end of the roll which presents difficulty in packaging and limits the length of material which can be practically coiled. Since tape tends to deteriorate with time, shelf or storage life is limited. Further, utilizing a roll not supported by a dispensing apparatus is cumbersome and unwieldy to manipulate.

It would be highly advantageous, therefore, to remedy the foregoing and other deficiencies in the prior art.

Accordingly, it is an object of the present invention to provide improvements in sheet material especially adapted for use in connection with masking apparatus of the type for dispensing tape and sheet material.

Another object of the invention is the provision of masking sheet material which will extend the normal capacity of the masking apparatus.

And another object of this invention is to provide a roll of coiled sheet material for masking a surface of greater width than the width of the roll.

Still another object of the invention is the provision of a roll of folded, coiled sheet material especially devised to have masking tape applied thereto at the time of dispensing.

Yet another object of the instant invention is to provide convenient, easily usable means for masking surfaces of extended area.

Yet still another object of the invention is the provision of folded masking sheet material which is readily unfolded and draped after being adhesively affixed to the surface to be masked.

And a further object of the immediate invention is to provide a roll of coiled sheet material which is uniquely folded to insure that the tape adheres only to a selected portion of the material.

Still a further object of the invention is the provision of a roll of coiled sheet material in which the number of folds are variously selectable.

Yet a further object of this invention is to provide folded coiled masking sheet which is readily fabricated of various materials.

And yet a further object of the invention is the provision of a roll of masking material according to the above which is unencumbered to facilitate packaging, storing and handling.

SUMMARY OF THE INVENTION

Briefly, to achieve the desired objects of the instant invention in accordance with a preferred embodiment thereof, provided is an elongate sheet of flexible, fluid impervious material having first and second longitudinal edges and first and second sides. A fold extending longitudinally intermediate the edges defines a doubled sheet including first and second pleats. The first pleat resides intermediate the first edge and the fold. The second pleat resides intermediate the fold and the second edge. The fold is in a direction such that the second side of the second pleat lies in substantial juxtaposition with the second side of the first pleat. The doubled sheet is coiled in a direction of rotation to expose the first side of the first pleat for receiving tape along the first edge thereof.

In accordance with a further embodiment of the invention, the first pleat has a width which is greater than the width of the second pleat whereby the second edge is placed inboard of the first edge. Thus there is defined a longitudinally extending terminal portion adjacent the first edge for receiving the tape thereon.

In accordance with a further embodiment of the invention, the elongate sheet includes a plurality of spaced apart folds including a first fold nearest the first edge and a last fold nearest the second edge. The plurality of folds define a redoubled sheet including a pleat intermediate adjacent ones of the plurality of folds, an initial pleat intermediate the first edge of the first fold and a terminal pleat intermediate the last fold and second edge. The folds are in alternating directions whereby respective sides of adjacent pleats lie in substantial juxtaposition. Further, the plurality of folds are periodically spaced whereby alternate ones are substantially aligned in respective planes generally perpendicular to the axis about which the redoubled sheet is coiled.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which.

DETAILED DESCRIPTION OF THE PREFERRED EMBODIMENTS

Figure 1:
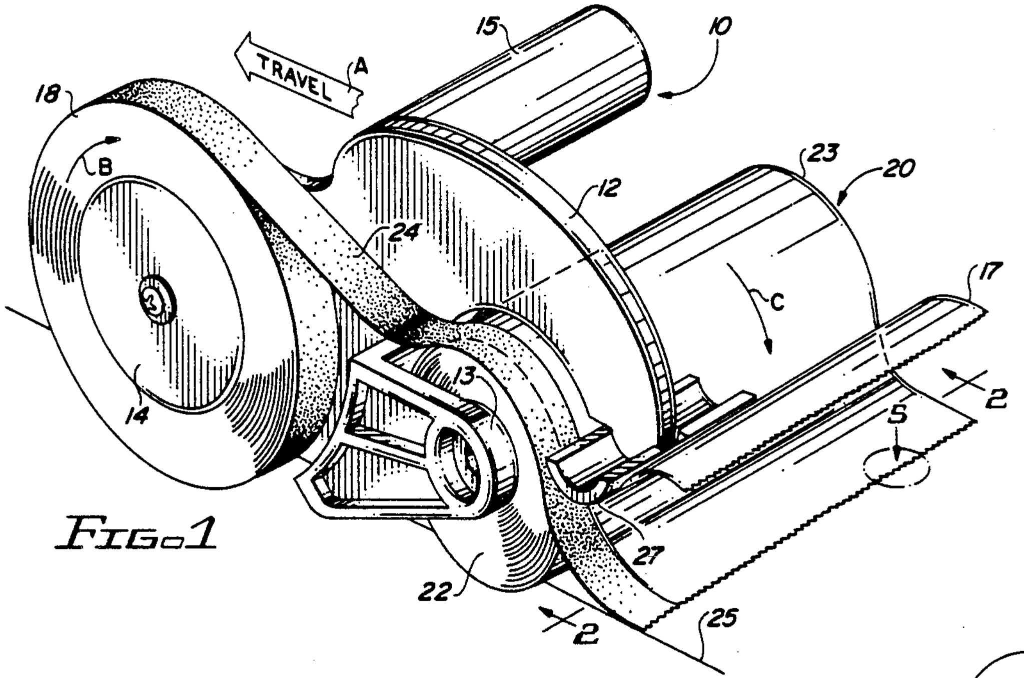
FIG. 1 is a perspective view of a roll of coiled sheet material constructed in accordance with the teachings of the instant invention as it would appear when being used in connection with a conventional masking apparatus.

Turning now to the drawings, in which like reference characters indicate corresponding elements throughout the several views, attention is first directed to FIG. 1 which illustrates a masking apparatus, generally designated by the reference character 10 for dispensing sheet material and pressure sensitive adhesive. Herein chosen for purposes of illustration as being of the portable or manually manipulatable type, masking apparatus 10 includes frame 12 having first holder 13, second holder 14 and handle 15. Holders 13 and 14, more specifically, are in the form of rotatably mounted spindles for supporting a roll of coiled sheet and a roll of pressure sensitive adhesive, respectively. Cutting blade 17 is also carried by frame 12. A roll of conventional masking tape is shown as being mounted upon second holder 14.

A roll of coiled sheet material, generally designated by the reference character 20, having first end 22 and second end 23 and incorporating the principals of the instant invention is carried by first holder 13. It is noted that the width of roll 20, the distance between ends 22 and 23, generally corresponds with the length of cutter blade 17. Further details of roll 20 will be discussed presently.

As will be immediately understood and appreciated by those skilled in the art, a ribbon of tape 24 from roll 18 extends over and is secured to roll 20. The ribbon of tape 24 overlaps end 22 of roll 20. That is, that portion of the ribbon adjacent the inner edge is secured to the outer surface of roll 20 while that portion of the tape adjacent the outboard edge remains free to be affixed to the surface to be masked. As the apparatus is moved in the direction indicated by the arrowed line A, the masking material 20 and the tape 18 are progressively uncoiled for continuous dispensing. The direction of uncoiling of roll of tape 18 and of roll 20 are designated by the arrowed lines B and C, respectively. The exposed edge of ribbon 24 is continuously affixed to the surface 25 either by manual pressure or by applicator 27 integral with frame 12. When the desired length of material has been dispensed, blade 17 is employed to sever both the tape and the masking sheet.

The foregoing brief description is specifically directed to a masking apparatus of the type usually referred to as a hand held masking machine. The structure and principals of operation are equally analogous to the stationary device commonly referred to as an apron taper. The foregoing is set forth for purposes of orientation and reference in connection with the ensuing description. Details not specifically illustrated nor described will be readily apparent to those skilled in the art.

In the foregoing description, roll 20 was treated as a conventional prior art roll of masking sheet commonly used in connection with machines of the type The conventional roll consists of a single roll of paper having a sheet width corresponding to the width of the roll. Accordingly, the area which can be masked also corresponds to the width of the roll. It is a principal of the instant invention that the inventive sheet material is utilized as a conventional prior art roll during the above described masking procedure.

Figure 2:
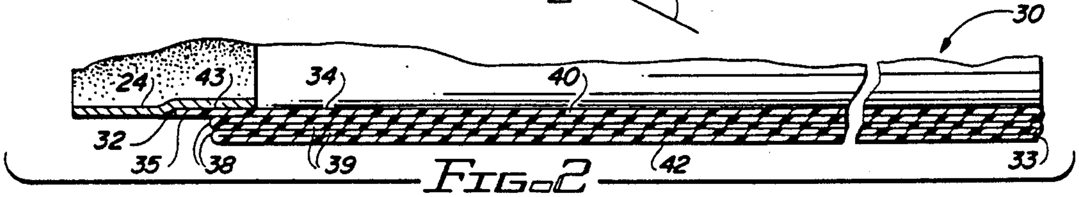
FIG. 2 is a vertical sectional view, on an enlarged scale, taken along the line 2—2 of FIG. 1 and illustrating the inventive sheet material in greater detail.

With reference to FIG. 2, it is seen that the coiled sheet material of roll 20 comprises an elongate sheet, generally designated by the reference character 30, having first longitudinal edge 32, second longitudinal edge 33 and first and second sides 34 and 35, respectively. Sheet 30 is divided by a plurality of folds which, for purposes of reference, may be considered to be first folds 37 and second folds 38, into a plurality of pleats 39 residing intermediate adjacent folds. An initial pleat 40 resides intermediate first edge 32 and the first of the first folds 37. A terminal pleat 42 resides intermediate the last of the second pleats 38 and second edge 33.

Each of the first folds 37 are made in a direction which is opposite to the direction of each of the second folds 38. Accordingly, respective sides of the adjacent pleats lie in juxtaposition. That is, side 35 of initial pleat 34 is adjacent side 35 of the second pleat. Similarly, side 34 of the second pleat is adjacent side 34 of the third pleat. A terminal portion 43 of initial pleat 40 adjacent first edge 32 projects beyond the second folds 38.

The several folds and pleats define a redoubled sheet which is coiled into roll 20 in a direction such that first side 34 of initial pleat 40 is continuously presented as the outer surface. Accordingly, the ribbon of tape 24 is continuously applied to side 34 of terminal portion 43 during dispensing. Particularly noted in the instant illustration, is the fact that a portion of the ribbon 24 is secured to the side 34 of sheet 30 while a portion of the ribbon 24 is free to be affixed to the surface to be masked. It is also noted, that in accordance with the immediately preferred embodiment, each of the first folds 37 are aligned in a plane which is generally perpendicular to the axis about which the redoubled sheet is coiled. Similarly, each of the second folds 38 are aligned in a second plane which is also perpendicular to the axis about which the redoubled sheet is coiled.

The thickness of the pleats seen in FIG. 2 is greatly exaggerated for purposes of illustration. Preferably, sheet 30 is fabricated of a relatively thin, plastic film. The thickness of the film is in the range of 0.0002 inches to 0.0400 inches, while the generally preferred thickness is 0.0004 inches.

As clearly illustrated in FIG. 2, terminal portion 43 is cantilevered. That is, the terminal portion of one coil of roll 20 is separated from the terminal portion of the succeeding coil by the thickness of the intervening pleats. For proper receipt of the tape, terminal portion 43 must be provided with at least minimal support. As is obvious, the support of the terminal portion is inversely proportioned to the width. For this reason, the maximum preferred width of terminal portion 43 is 0.312 inches. The minimum width can be anything greater than 0 for reasons which will be explained presently. A range of 0.063 to 0.188 has found to have performed most satisfactorily.

Figures 3A, 3B, 3C, 3D:
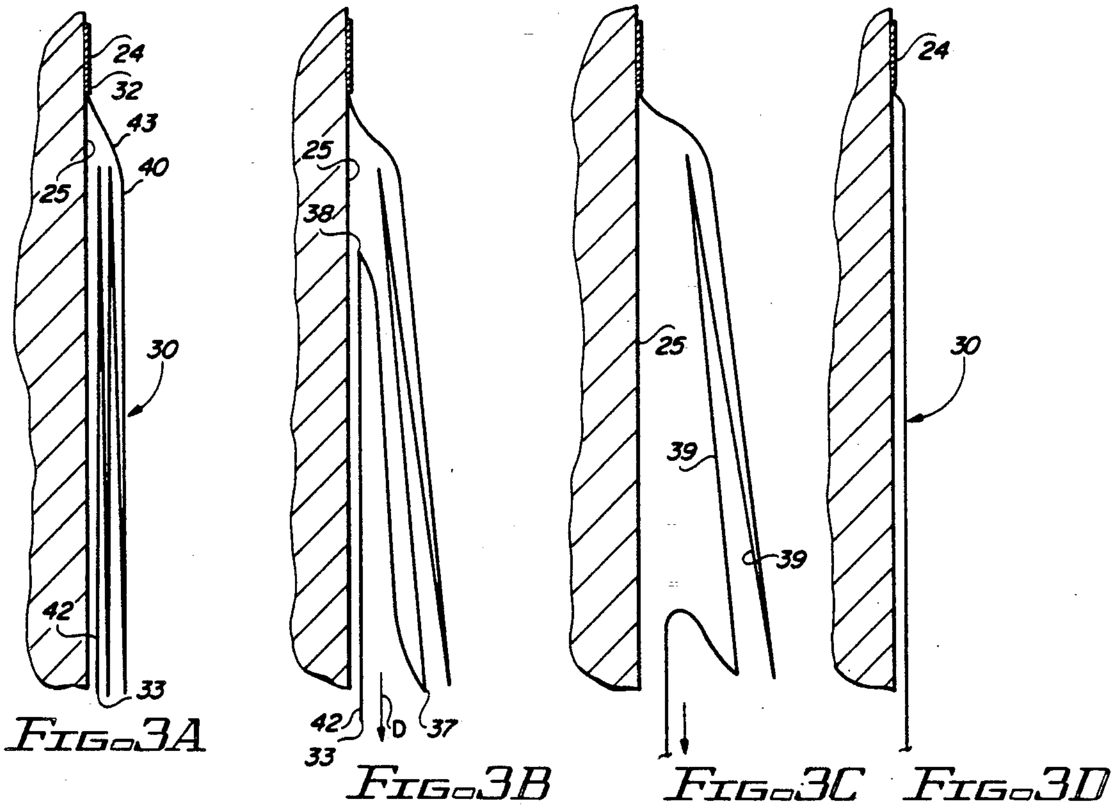
FIG. 3A is a view generally corresponding to the view of FIG. 3 and showing the sheet material as it would initially appear after being applied to a surface to be masked.
FIG. 3B is a view generally corresponding to the view of FIG. 3A and showing the initial step of unfolding the material.
FIG. 3C is a view generally corresponding to the view of FIG. 3A and showing the material as it would appear during an intermediate stage of being unfolded.
FIG. 3D is a view generally corresponding to the view of FIG. 3A showing the material as it would appear when completely unfolded and draped over the masked surface.

After being applied to surface 25 by tape 24, redoubled sheet 30 will appear as generally illustrated in FIG. 3A. For clarity of illustration, the pleats have been slightly expanded and the length of terminal portion 43 exaggerated. It being understood that in actuality, the surface 25 and the several pleats will lie in close juxtaposition. The number of folds and pleats in sheet 30 are selected such that the ends 32 and 33 extend in opposite directions. Further noted is the fact that terminal pleat 42 and second end 33 lie adjacent surface 25.

The unfolding and draping procedure is begun, as viewed in FIG. 3B, by urging terminal pleat 42 in the direction of arrowed line D. During actual use, terminal pleat 42 is grasped by the user proximate edge 33 and pulled in the indicated direction. In response to continued pulling, each successive fold is unfolded as seen in FIG. 3C. The pulling and unfolding continues until, as viewed in FIG. 3D, the sheet 30 is completely unfolded and draped over the surface to be masked.

It is noted that during the procedure described in connection with FIGS. 3A–3D, each of the second folds 38 were readily free to move. That is, none were inadvertently secured under the ribbon of pressure sensitive adhesive tape 24. This is attributed to the fact that terminal portion 43 projects beyond any second fold 38. It has been determined that the minimal width of terminal portion 43 may be any dimension greater than 0.000 inches. A suggested minimal measurement is 0.003 inches.

Figure 4A:
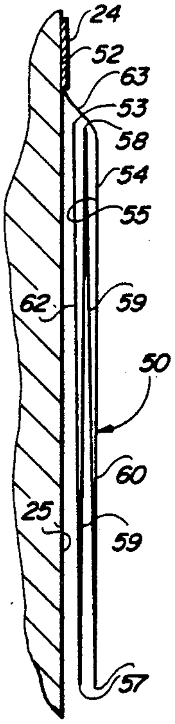
FIG. 4A is a view generally corresponding to the illustration of FIG. 3A and showing an alternate embodiment thereof.
Figure 4B:
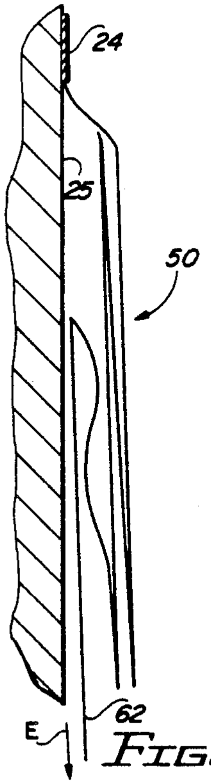
FIG. 4B is a view generally corresponding to the view of FIG. 4A and showing the initial step of unfolding the material.
Figure 4C:
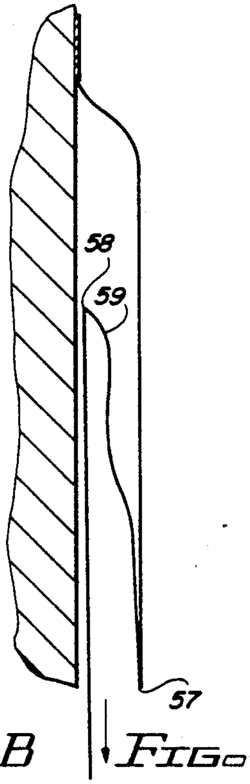
FIG. 4C is a view generally corresponding to the view of FIG. 4A and showing the material as it would appear during an intermediate stage of being unfolded.

The number of folds and pleats in a given sheet of masking material is selectively variable. With reference to FIG. 4A there is seen an alternate embodiment of the invention including sheet 50 having first edge 52, second edge 53, first side 54 and second side 55 Sheet 50 is divided by first folds 57 and second folds 58 into a plurality of pleats 59. Initial pleat 60 extends between first edge 52 and the first of the first folds 57. A terminal pleat 62 extends between the last of the first pleats and the second edge 53. Also included is a terminal portion 63 carried by initial pleat 60 adjacent first edge 52 and projecting beyond the second folds 58.

Sheet 50 is redoubled by a number of folds and pleats selected such that first end 52 and second end 63 extend in the same direction. In all other aspects not specifically described, sheet 50 is analogous to sheet 30.

Figure 4D:
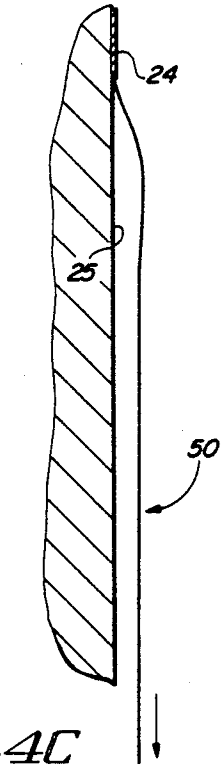
FIG. 4D is a view generally corresponding to the view of FIG. 4A showing the material as it would appear when completely unfolded and draped over the masked surface.

Again, in general similarity to the previously described embodiment, the unfolding of sheet 50 is initiated by drawing the terminal pleat 62 in a direction away from tape 24 as indicated by the arrowed line E. The unfolding procedure continues until the sheet 50 is substantially straightened to lie over the surface 25 as seen in FIG. 4D.

Figure 5A:
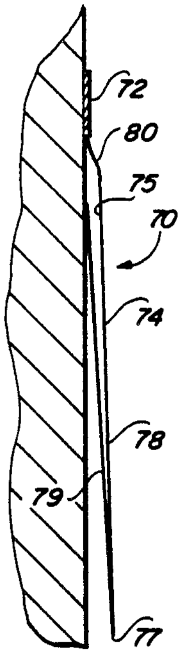
FIG. 5A is a view generally corresponding to the view of FIG. 3A and showing yet another embodiment of the invention.

Referring now to FIG. 5A there is seen yet another embodiment of the invention including an elongate sheet, generally designated by the reference character 70, having first longitudinal edge 72, second longitudinal edge 73, first side 74 and second side 75. In contrast to the previously describe embodiments, sheet 70 is divided by a single fold 77 into a first pleat 78 and a second pleat 79. Fold 77 is turned in a direction such that first side 75 of first pleat 78 lies in juxtaposition with second side 75 of second pleat 79. Terminal portion 80 carried by first pleat 78 projects beyond second edge 73.

Figure 5B:
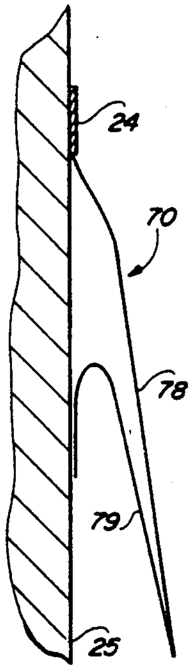
FIG. 5B is a view generally corresponding to the view of FIG. 5A and showing the initial step of unfolding the material.

The sheet 70 is unfolded over surface 25 in a manner generally analogous to the previously described embodiments as seen in FIG. 5B.

The elongate sheets described in connection with the several embodiments of the invention are fabricated of a flexible, fluid impervious material. Especially preferred is a thermal plastic resin such as polyethylene, polypropylene or polyester. The embodiments may also be fabricated of conventional materials such as paper products. The light transmission of the several materials is readily variable in accordance with the user's desires.

The material may be opaque, translucent or transparent. The transparent and opaque materials provide for light transmission whereby, for example, a large surface having windows or lighting fixtures, may be continuously masked without substantially diminishing illumination within a room or other enclosure. Opaque or translucent material provides a readily visible indication that an area has been masked.

Figure 6:
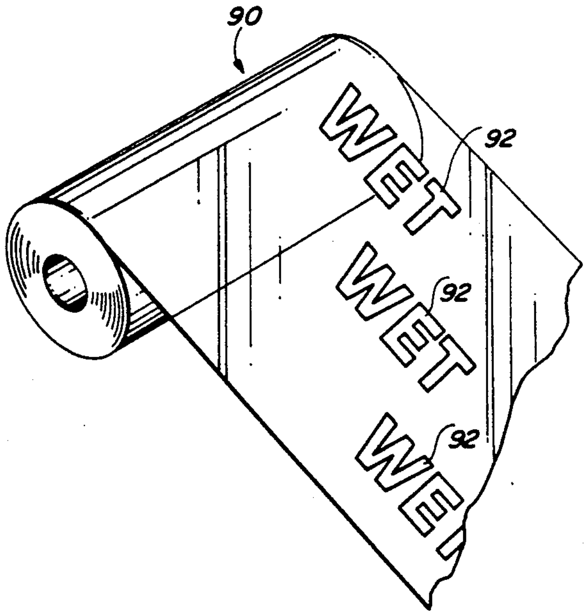
FIG. 6 is a respective view of a coiled roll of sheet material illustrating yet another embodiment incorporating the principals of the instant invention.

Referring to FIG. 6 there is seen a roll of coiled sheet embodying the principals of the instant invention as specifically set forth in the foregoing detailed description, having indicia 92 printed thereon. The indicia may be of any selected wordage and in any predetermined pattern. The indicia may be selected to convey a particular message such as "wet paint", the manufacturer's logo or other designation. When used in combination with transparent sheet material, the indicia serves as a readily visible indicator that an area has been masked.

Various changes and modifications to the embodiments herein for purpose of illustration will readily occur to those skilled in the art. To the extent that such modifications and variations do not depart from the spirit from the invention, they are intended to be included within the scope thereof which is limited only by a fair assessment of the following claims.

Having fully described and disclosed the present invention and alternately preferred embodiments thereof in such clear and concise terms as to enable those skilled in the art to practice and understand the same, the invention claimed is:

1. A roll of masking material having an axis, said roll of masking material comprising a coiled elongate thin flexible sheet having opposite first and second untaped elongate edges, and said roll of masking material having first and second axially spaced ends with said first end of said roll being defined by the first elongate edge of said sheet;

said roll of masking material being adapted to be used in combination with a tape roll comprising a coiled length of tape having opposite first and second elongate edges and comprising a coating of pressure sensitive adhesive; and a dispensing apparatus comprising:

a frame;

first and second spindles mounted on the frame and having spaced generally parallel axes, the first spindle including means for receiving the tape roll for rotation coaxially about the axis of the first spindle and for positioning the first edge of the length of tape at a first predetermined position axially with respect to the first and second spindles, and the second spindle including means for receiving said roll of masking material for rotation coaxially about the axis of the second spindle and for positioning the first edge of the sheet at a second predetermine position axially with respect to the first and second spindles with the width of the length of tape extending from the first position past the second position and the width of the masking material extending from the second position past the first position so that a portion of the length of tape along the first edge of the length of tape and a portion of the sheet along the first edge of the sheet are both positioned between the first and second positions; and path defining means on said frame and including said means for locating said first edges of said tape and said sheet material at said first and second positions axially with respect to said spindles, said path defining means defining a path for the length of tape from the tape roll and a path for said sheet from said roll of making material, the paths including a tape path portion for the tape from the tape roll to the periphery of said roll of masking material and a common path portion beginning along the periphery of said roll of masking material where, in response to the tape and said masking material being pulled from the dispensing apparatus, the pressure sensitive adhesive along the first edge of the length of tape adheres to said portion of the sheet along the first edge of the sheet on the periphery of the roll of masking material to form a tape and sheet composite having opposite edges defined by the second edges of the length of tape and said sheet and an exposed portion of the coating of pressure sensitive adhesive along the second edge of the length of tape;

said coiled elongate thin flexible sheet having a longitudinally extending first fold at the second end of said roll of masking material and between said first and second edges of said sheet, said first fold defining a second edge of a first pleat-like portion of said sheet extending between said first fold and said first edge of said elongate sheet, said first pleat-like portion having opposite inner and outer major surfaces with said outer major surface being disposed radially outwardly on said roll of masking material with respect to said inner major surface, and said first fold defining a first edge of a second pleat-like portion of said sheet extending from said first fold toward the first end of said roll of masking material along the inner major surface of said first pleat-like portion and having a second longitudinally extending edge adjacent the first end of said roll of masking material, said second longitudinally extending edge of said second pleat-like portion being spaced along said first pleat-like portion from said first edge of said sheet by a distance of at least about 0.003 inch to restrict contact of the pressure sensitive adhesive on the tape with the second edge of said second pleat-like portion when the tape is adhered to the outer surface of the first pleat-like portion of the sheet on the roll of masking material, and no greater than about 0.312 inch so that the second pleat-like portion will help to provide support radially of the roll of masking material for the first pleat-like portion of the sheet closely adjacent the first edge of the first to assure firm engagement of the pressure sensitive adhesive with the sheet adjacent said first edge as the tape and sheet are pulled from the dispensing apparatus to form the tape and sheet composite.

2. A roll of masking material according to claim 1, wherein said second longitudinally extending edge of said second pleat-like portion is defined by the second edge of said sheet.

3. A roll of masking material according to claim 1, wherein said coiled elongate sheet has a plurality of longitudinally extending folds including said first fold and a second fold at the second longitudinally extending edge of said second pleat-like portion, said folds defining a plurality of pleat-like portions of said sheet disposed radially inwardly of said roll of masking material from the inner major surface of said first pleat-like portion and having longitudinally extending generally radially aligned edges adjacent the first end of said roll of masking material and spaced from said first edge of said sheet by a distance in the range of 0.063 to 0.188 inch.

4. A roll of masking material according to claim 3, wherein said coiled elongate sheet has four longitudinally extending folds including said first fold and a second fold at the second longitudinally extending edge of said second pleat-like portion, said folds defining four pleat-like portions of said sheet disposed radially inwardly of said roll of masking material from the inner major surface of said first pleat-like portion and having longitudinally extending generally radially aligned edges adjacent the first end of said roll of masking material.

5. A roll of masking material according to claim 1 wherein said elongate sheet is of polymeric material and has a thickness of about 0.0004 inch.

6. A dispensing apparatus comprising:

a roll of masking material having an axis, said roll of masking material comprising a coiled elongate thin flexible sheet having opposite first and second untaped elongate edges, and said roll of masking material having first and second axially spaced ends with said first end of said roll being defined by the first elongate edge of said sheet;

a tape roll comprising a coiled length of tape having first and second elongate edges and comprising a coating of pressure sensitive adhesive;

a frame;

first and second spindles having spaced generally parallel axes and being mounted on said frame for rotation about said axes, said tape roll being mounted coaxially about the first spindle with the first edge of the length of tape at a first predetermined position axially with respect to said first and second spindles, and said roll of masking material being mounted coaxially about the second spindle with the first edge of the sheet at a second predetermined position axially with respect to said first and second spindles, and with the width of said length of tape extending from the first position past the second position and the width of the masking material extending from the second position past the first position so that a portion of the length of tape along the first edge of the length of tape and a portion of the sheet along the first edge of the sheet are both positioned between said first and second positions; and path defining means on said frame and including means for locating said first edges of said tape and said sheet material at said first and second positions axially with respect to said spindles, said path defining means defining a path for said length of tape from said tape roll and a path for said sheet from said roll of masking material, said paths including a tape path portion for said tape from said tape roll to the periphery of said roll of masking material and a common path portion beginning along the periphery of said roll of masking material where, in response to the tape and said masking material being pulled from the dispensing apparatus, the pressure sensitive adhesive along the first edge of the length of tape adheres to said portion of the sheet along the first edge of the sheet on the periphery of the roll of masking material to form a tape and sheet composite having opposite edges defined by the second edges of the length of tape and the sheet and an exposed portion of the coating of pressure sensitive adhesive along the second edge of the length of tape;

said coiled elongate sheet having a longitudinally extending first fold at the second end of said roll of masking material and between said first and second edges of said sheet, said first fold defining a second edge of a first pleat-like portion of said sheet extending between said first fold and said first edge of said elongate sheet, said first pleat-like portion having opposite inner and outer major surfaces with said outer major surface being disposed radially outwardly on said roll of masking material with respect to said inner major surface, and said first fold defining a first edge of a second pleat-like portion of said sheet extending from said first fold toward the first end of said roll of masking material along the inner major surface of said first pleat-like portion and having a second longitudinally extending edge adjacent the first end of said roll of masking material, said second longitudinally extending edge of said second pleat-like portion being spaced along said first pleat-like portion from said first edge of said sheet by a distance of at least about 0.003 inch to restrict contact of the pressure sensitive adhesive on the tape with the second edge of said second pleat-like portion when the tape is adhered to the outer surface of the first pleat-like portion of the sheet on the roll of masking material, and by a distance of no greater than about 0.312 inch so that the second pleat-like portion will provide support radially of the roll of masking material for the first pleat-like portion of the sheet closely adjacent the first edge of the sheet to assure firm engagement of the pressure sensitive adhesive with the sheet adjacent said first edge as the tape and sheet are pulled from the dispensing apparatus to form the tape and sheet composite.

7. A dispensing apparatus according to claim 6, wherein said second longitudinally extending edge of said second pleat-like portion is defined by the second edge of said sheet.

8. A dispensing apparatus according to claim 6, wherein said coiled elongate sheet has a plurality of longitudinally extending folds including said first fold and a second fold at the second longitudinally extending edge of said second pleat-like portion, said folds defining a plurality of pleat-like portions of said sheet disposed radially inwardly of said roll of masking material from the inner major surface of said first pleat-like portion and having longitudinally extending generally radially aligned edges adjacent the first end of said roll of masking material and spaced from said first edge of said sheet by a distance in the range of 0.063 to 0.188 inch.

9. A dispensing apparatus according to claim 8, wherein said coiled elongate sheet has four longitudinally extending folds including said first fold and a second fold at the second longitudinally extending edge of said second pleat-like portion, said folds defining four pleat-like portions of said sheet disposed radially inwardly of said roll of masking material from the inner major surface of said first pleat-like portion and having longitudinally extending generally radially aligned edges adjacent the first end of said roll of masking material.

10. A dispensing apparatus according to claim 6 wherein said elongate sheet is of polymeric material and has a thickness of about 0.0004 inch.

11. A dispensing apparatus according to claim 6 wherein said dispensing apparatus is portable, and said frame includes a handle adapted for manual engagement to manipulate said dispensing apparatus.

12. A method for applying tape along one edge portion of masking material, the method comprising the steps of:

providing a roll of masking material having an axis, the roll of masking material comprising a coiled elongate thin flexible sheet having opposite first and second untaped elongate edges, and the roll of masking material having first and second axially spaced ends with the first end of the roll being defined by the first elongate edge of the sheet;

providing a tape roll comprising a coiled length of tape having first and second elongate edges and comprising a coating of pressure sensitive adhesive;

providing a dispensing apparatus comprising a frame and first and second spindles having spaced generally parallel axes and being mounted on the frame for rotation about the axes;

mounting the tape roll coaxially about the first spindle with the first edge of the length of tape at a first predetermined position axially with respect to the first and second spindles;

mounting the roll of masking material coaxially about the second spindle with the first edge of the sheet at a second predetermined position axially with respect to the first and second spindles, and with the width of the length of tape extending from the first position past the second position and the width of the masking material extending from the second position past the first position so that a portion of the length of tape along the first edge of the length of tape and a portion of the sheet along the first edge of the sheet are both positioned between the first and second positions; and pulling the tape and masking material from the dispensing apparatus along paths relative to the frame including a path for the length of tape from the tape roll and a path for the sheet from the roll of masking material, the paths including a tape path portion for the tape from the tape roll to the periphery of the roll of masking material and a common path portion beginning along the periphery of the roll of masking material so that the pressure sensitive adhesive along the first edge of the length of tape adheres to the portion of the sheet along the first edge of the sheet on the periphery f the roll of masking material to form a tape and sheet composite having opposite edges defined by the second edges of the length of tape and the sheet and an exposed portion of the coating of pressure sensitive adhesive along the second edge of the length of tape;

the coiled elongate sheet having a longitudinally extending first fold at the second end of the roll of masking material and between the first and second edges of the sheet, the first fold defining a second edge of a first pleat-like portion of the sheet extending between the first fold and the first edge of the elongate sheet, the first pleat-like portion having opposite inner and outer major surfaces with the outer major surface being disposed radially outwardly on the roll of masking material with respect to the inner major surface, and the first fold defining a first edge of a second pleat-like portion of the sheet extending from the first fold toward the first end of the roll of masking material along the inner major surface of the first pleat-like portion and having a second longitudinally extending edge adjacent the first end of the roll of masking material, the second longitudinally extending edge of the second pleat-like portion being spaced along the first pleat-like portion from the first edge of the sheet by a distance of at least about 0.003 inch to restrict contact of the pressure sensitive adhesive on the tape with the second edge of the second pleat-like portion when the tape is adhered to the outer surface of the first pleat-like portion of the sheet on the roll of masking material, and by a distance of no grater than about 0.312 inch so that the second pleat-like portion will provide support radially of the roll of masking material for the first pleat-like portion of the sheet closely adjacent the first edge of the sheet to assure firm engagement of the pressure sensitive adhesive with the sheet adjacent the first edge as the tape and sheet are pulled from the dispensing apparatus to form the tape and sheet composite.

* * * * *

UNITED STATES PATENT AND TRADEMARK OFFICE

CERTIFICATE OF CORRECTION

PATENT NO. : 5,113,921

DATED : May 19, 1992

INVENTOR(S) : Dan B. Poole

It is certified that error appears in the above-indentified patent and that said Letters Patent is hereby corrected as shown below:

Col 8, line 4, change "making material" to --masking material--;

Col. 8, line 50, change "of the first" to --of the sheet--;

Col. 12, line 37, change "grater" to --greater--.

Signed and Sealed this

Seventeenth Day of May, 1994

Attest:

Bruce Lehman

BRUCE LEHMAN

Attesting Officer

*Commissioner of Patents and Trademarks*